March 1, 1966     O. M. ULBING     3,237,742
TORQUE RELEASING CLUTCH MECHANISM WITH POWER CUTOFF
Filed June 19, 1964

INVENTOR.
OTMAR M. ULBING
BY
David W. Tillott
ATTORNEY

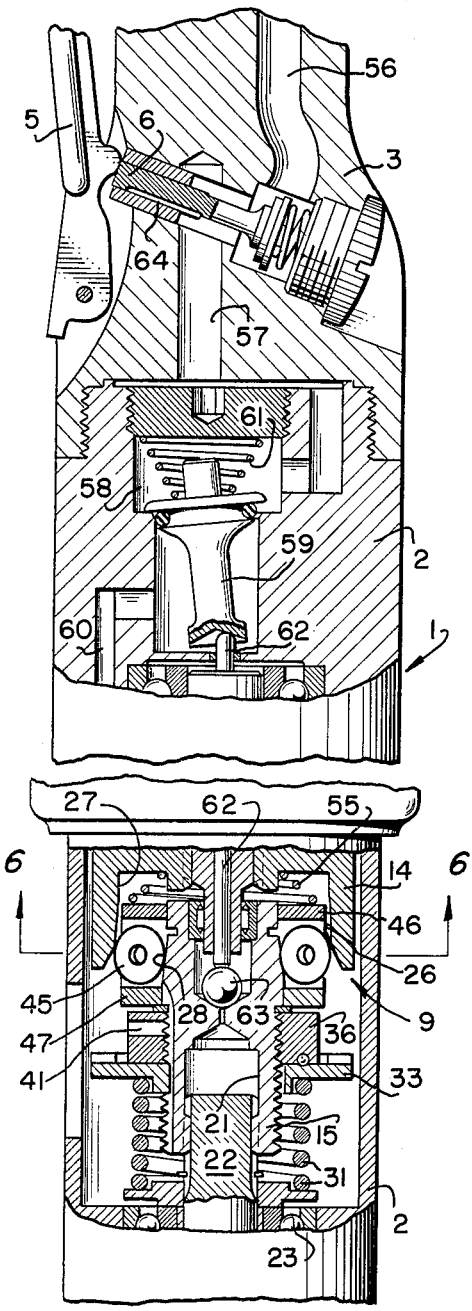
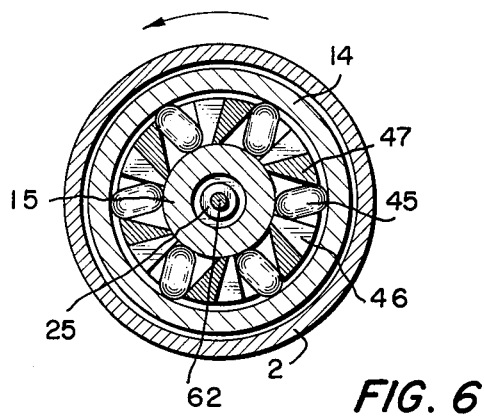
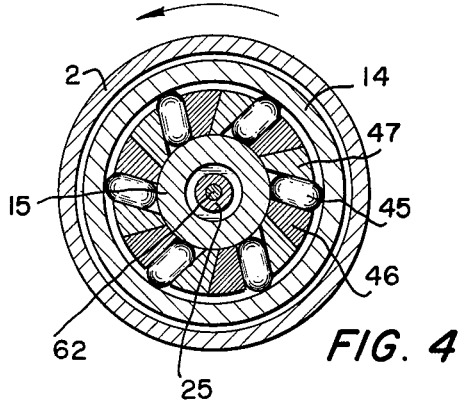

March 1, 1966     O. M. ULBING     3,237,742
TORQUE RELEASING CLUTCH MECHANISM WITH POWER CUTOFF
Filed June 19, 1964     3 Sheets-Sheet 3

INVENTOR.
OTMAR M. ULBING
BY
David W. Tibbott
ATTORNEY

United States Patent Office 3,237,742
Patented Mar. 1, 1966

3,237,742
TORQUE RELEASING CLUTCH MECHANISM
WITH POWER CUTOFF
Otmar M. Ulbing, Lisle, N.Y., assignor to Ingersoll-Rand Company, New York, N.Y., a corporation of New Jersey
Filed June 19, 1964, Ser. No. 376,427
11 Claims. (Cl. 192—150)

This invention relates to a torque release clutch mechanism which opens a drive connection between a driving member and a driven member when the torque load on said members exceeds a predetermined value or magnitude. The torque release clutch mechanism of this invention is particularly useful in tools which apply torque loads to fasteners, such as power-operated wrenches or screwdrivers.

In driving a screw or other threaded fastener "home," into a holding position, it is highly desirable to use a power-operated tool containing a torque release clutch which automatically releases the torque driving force on the fastener after it is tightened to a selected or predetermined torque load. In order to prevent the tool from "kicking" the operator, the clutch must release the torque load at relatively high speed; otherwise if the clutch releases relatively slowly, the operator receives an undesirable reaction while the clutch is releasing. During the period that the clutch is engaged, the drive from the tool motor to the fastener must be as rigid (non-yielding) as possible for efficient transmission of the torque. On the other hand, once the clutch releases, the release of torque must be complete to prevent the application of an undesirable reaction torque on the operator.

In addition to the above problems, it is desirable that the clutch be free to re-engage itself at the proper time regardless of the relative position of its clutch members. It is also desirable that the clutch disengage or re-engage without impacting.

The principal object of this invention is to provide a torque release clutch mechanism having a relatively simplified structure of a novel type and which substantially eliminates or minimizes the foregoing problems.

Other important objects of this invention are: to provide a torque release clutch mechanism which releases itself under a selected torque load with the torque release being performed at a relatively high speed and being a complete torque release; to provide a torque release clutch mechanism which can be adjusted to release at a predetermined torque load; to provide a torque release clutch mechanism which rigidly transmits a torque load before it is released and which releases the transmission of torque completely after it opens; and to provide a novel torque release clutch mechanism cooperating with a normally open motor valve which automatically closes and shuts off the motor in response to the release of the clutch mechanism.

Still further objects of the invention are: to provide a torque releasing clutch which can be re-engaged regardless of the relative position of its clutch members; and to provide a torque release clutch which cannot impact or otherwise provide a rotational hammering type of load.

The invention is described in connection with the accompanying drawings wherein:

FIG. 4 is a section taken on line 4—4 of FIG. 1;

FIG. 5 is a fragmentary broken view illustrating the clutch of FIG. 1 as it releases itself, the sprags of the clutch being shown as they tilt to a released position, the hand throttle being open and the motor shut-off valve being partially closed;

FIG. 6 is a section taken on line 6—6 of FIG. 5;

Figure 1:
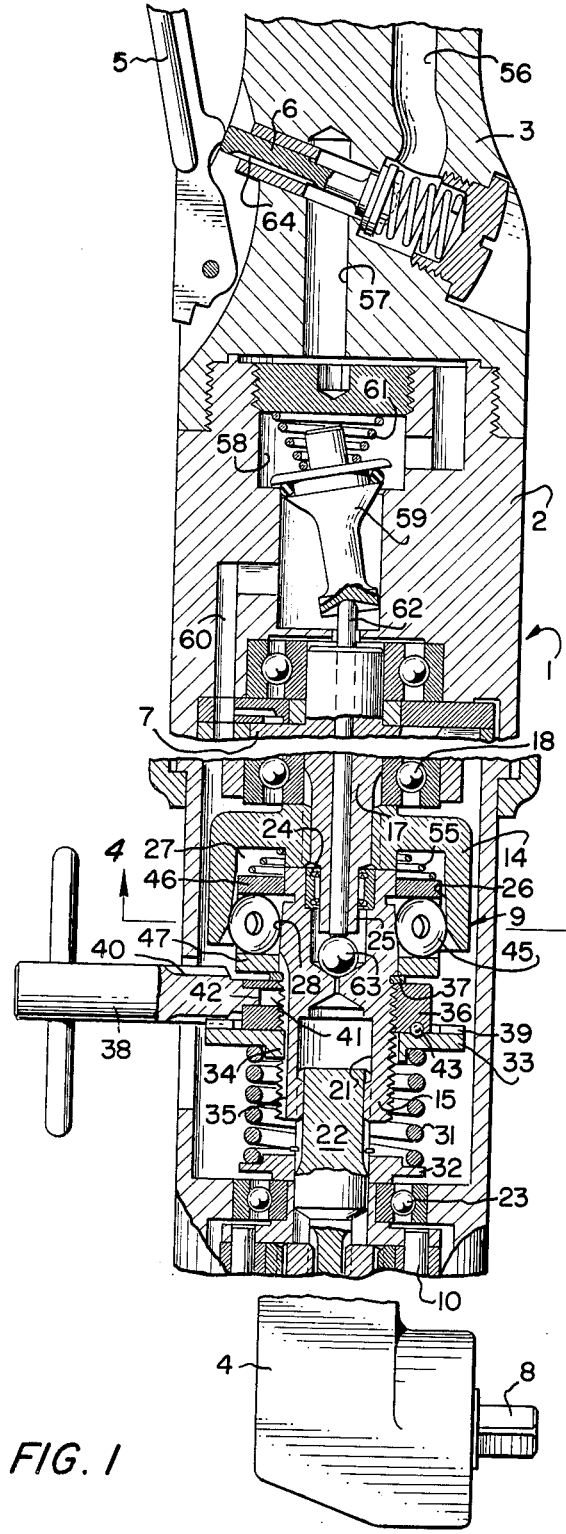
FIG. 1 is an elevational view with portions broken away of an angle wrench containing a torque release clutch embodying the concepts of this invention, the clutch being shown in its normally engaged position and the hand throttle of the tool being closed.

The pneumatic-powered angle wrench 1 shown in the drawings includes a casing 2 having a backhead 3 and a front nose 4. The backhead 3 carries a pivoted throttle lever 5 acting on a throttle valve stem 6. The depression of the throttle lever 5 feeds pneumatic pressure to a rotary motor 7 contained in the casing 2. The front nose 4 carries a rotary spindle 8 having a square cross section and adapted to be connected to a conventional wrench socket (not shown) for driving nuts or bolts. The motor 7 drives the spindle 8 through a clutch mechanism 9 and a planetary gear train 10. This invention rests in the clutch mechanism 9.

The clutch mechanism 9 includes an enlarged hollow sleeve or cup portion 14 and an arbor 15 rotatably and slidably mounted in the hollow sleeve portion 14. The hollow sleeve portion 14 serves as a driving clutch member and the arbor 15 serves as a driven clutch member.

The rear end of the hollow sleeve portion 14 contains an internally splined bore receiving a splined motor drive shaft 17 of the motor 7. The motor drive shaft 17 is supported in a bearing 18 which also supports the hollow sleeve portion 14 against axial rearward movement.

The clutch arbor 15 contains an internally splined bore 21 on its front end which slidably fits on a rearwardly projecting splined output shaft 22 driving the planetary gear train 10. The output shaft 22 is journaled in a bearing 23 mounted in the casing 2. The rear end of the arbor 15 carries a bearing 24 which is slidably mounted on an axle pin 25 projecting forwardly from the front end of the motor drive shaft 17. The bearing 24 slides on the axle pin 25 as the arbor 15 moves axially relative to the sleeve 14.

The hollow sleeve portion 14 contains an interior conical surface 26 which diverges forward and is radially spaced from the arbor 15 to form an annular space 27. The arbor 15 has a tapering exterior surface 28 converging rearwardly. Thus, moving the clutch members 14 and 15 axially apart widens the annular space 27 and, conversely, moving the clutch members axially together narrows the annular space 27 in a radial direction. Normally, the rear end of the arbor 15 abuts the inner end of the sleeve 14 to limit the rearward movement of the arbor 15.

A heavy spring 31 is mounted over the output shaft 22 and the forward end of the arbor 15 for urging the arbor 15 rearwardly into the hollow sleeve 14. The front end of the spring 31 seats on an annular spring seat 32 mounted on the output shaft 22. The rear end of the spring 31 abuts a washer 33 which is slidably keyed on the arbor 15 by having a tang 34 sliding in a longitudinal keyway 35 formed in the arbor 15. The washer 33 seats against a nut 36 threaded on the arbor 15. A lock ring 37 is mounted on the arbor 15 and serves to limit the rearward movement of the nut 36.

The nut 36 is screwed or turned on the arbor 15 to adjust the tension on the spring 31 by a conventional geared chuck key 38. The rear face of the washer 33 carries gear teeth 39 adapted to interengage with the teeth 40 on the chuck key 38 and the periphery of the nut 36 contains a radial hole 41 adapted to receive the axle pin 42 on the geared chuck key 38 as shown in FIG. 1. When the geared chuck key 38 is located in the hole 41 in the position shown in FIG. 1 and turned, its teeth 40 force the washer 33 and the arbor 15 to turn in the nut 36, thus adjusting the nut 36 and washer 33 on the arbor 15. Obviously, the movement of the washer 33 axially on the arbor 15 serves to vary the tension on the spring 31.

The geared chuck key 38 is removed from the wrench 1 during the use of the wrench. The nut 36 is prevented from rotating relative to the washer 33 during operation of the wrench 1 by a detent ball 43 mounted in the inner face of the nut 36 and adapted to engage depressions in the rear face of the washer 33.

A plurality of doughnut-shaped sprags 45 are positioned in the annular space 27 between the inner surface 26 of the sleeve 14 and the circumferential surface 28 of the arbor 15. The diameter of the sprags 45 is slightly greater than the radial width of the annular space 27 when the arbor 15 is moved rearwardly into the sleeve 14 to its maximum extent. Since the sprags 45 are larger, they can be wedged between the interior of the sleeve 14 and the arbor 15 for transmitting a torque load from the sleeve 14 to the arbor 15 in a given direction of rotation. FIG. 4 shows the sprags 45 positioned to a tilted position for transmitting torque from the sleeve 14 acting in a counterclockwise direction. These positions of the sprags 45 are termed their driving positions.

The torque load transmitted by the sprags 45 attempts to wedge them between the sleeve 14 and arbor 15 and to tilt them through radially extending positions to forwardly tilted positions, as shown in FIG. 6. The forward tilting positions of the sprags 45 are termed non-driving positions because they are incapable of transmitting a torque from the sleeve 14 to the arbor 15. In these non-driving positions, the sleeve 14 rotating in a counterclockwise direction as shown in FIG. 6 acts to tilt the sprags 45 away from wedging positions.

In their driving positions, the torque load on the sprags 45 acting to wedge them between the sleeve 14 and arbor 15 creates a camming force serving to urge the arbor 15 axially forward away from the sleeve 14. The arbor 15 must move axially forward relative to the sleeve 14 before the sprags can flop forward to their non-driving positions. This axially forward relative movement of the arbor 15 is opposed by the spring 31, which, as a result, serves to determine the torque load on the sprags 45 which will cause them to release the clutch members 14 and 15. Changing the tension on the spring 31 varies the releasing torque load of the clutch. Thus, the spring 31 can be adjusted to provide a selected predetermined clutch releasing torque load within a range of clutch releasing torque loads.

Figure 3:
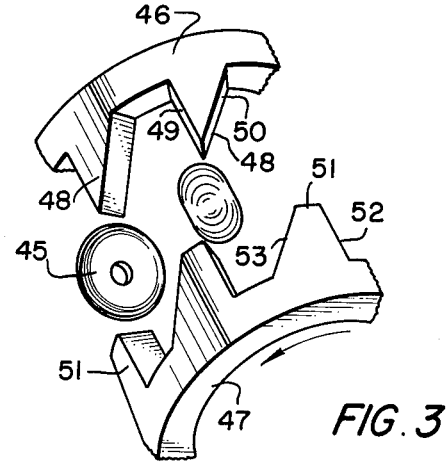
FIG. 3 is an exploded view of the clutch portions shown in FIG. 2.
Figure 2:
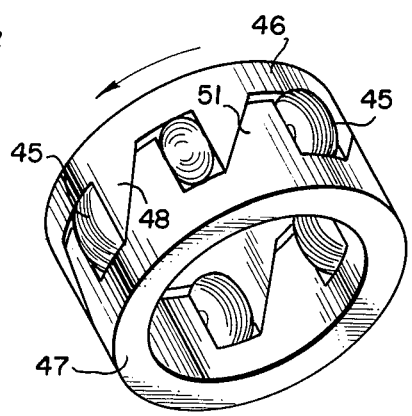
FIG. 2 is a perspective view of portions of the clutch including the sprags and re-engaging sprag cages.

Means is provided for resiliently urging the sprags 45 toward their driving positions with a light force. This means includes a pair of ring-shaped cages 46 and 47 sandwiching the sprags 45 between them, as illustrated in FIGS. 2 and 3.

The rear cage 46 includes a plurality of forwardly-extending angularly-spaced teeth 48 of saw-tooth or right-angle shape. Each tooth 48 includes a sprag-engaging side or surface 49 extending forward in a substantially axial direction and a cam side or surface 50 lying in a plane which cuts through the axis of the cage 46 at a substantial angle.

The front sprag cage 47 is similar to the rear cage 46 and includes a plurality of rearwardly-extending angularly-spaced teeth 51 with each tooth 51 having an axially-extending sprag-engaging side or surface 52 and a cam side or surface 53 which lies in a plane cutting the axis of the cage 47 at a substantial angle. The teeth 48 on the rear cage 46 interfit with the teeth 51 on the front cage 47 with the cam sides 50 and 53 of the teeth 48 and 51 engaging each other and with the sprags 45 sandwiched between the sprag-engaging sides 49 and 52 of the cage teeth. The sprag-engaging sides or surfaces 49 and 52 of the cage teeth are formed at an angle to radial planes of the cages to hold the sprags 45 in their driving positions as shown in FIG. 4.

As previously pointed out, in their driving positions, the sprags 45 can be wedged between the hollow sleeve 14 and arbor 15 by the direction of the torque transmitted through the sprags 45. Obviously, the driving positions of the sprags 45 will depend on the direction of rotation of the transmitted torque and which of the two clutch members 14 and 15 is being driven. In FIG. 4, the outer sleeve 14 is driven by the tool motor 7 in a counterclockwise direction. These conditions cause the driving positions of the sprags 45 to be arranged as shown in FIG. 4 tilted radially outwardly and rearwardly relative to radial planes.

The front cage 47 encircles the arbor 15 and seats against the rear face of the lock ring 37. The rear cage 46 is biased forwardly by a light spring 55 located between the cage 46 and the bottom of the sleeve or cup 14. With the spring 55 biasing the sprag cages 46 and 47 together, the cam sides 50 and 53 of the cage teeth act to rotate the cages relative to each other in a direction causing the sprag-engaging sides 49 and 52 of the cage teeth to force the sprags 45 to their driving positions. Thus, the sprags 45 are lightly and constantly biased toward their driving positions and when they tilt out of their driving positions they force the cages 46 and 47 axially apart. Although the spring 55 constantly biases the cages 46 and 47 together, it is too weak to prevent the sprags 45 from tilting to their non-driving positions when the torque load on the clutch rises to its predetermined releasing torque load.

The throttle valve stem 6 is connected to a conventional throttle valve, also numbered 6, which opens to feed air pressure from an inlet passage 56 to a forward passage 57. The forward passage 57 opens into a chamber 58 located rearwardly of a large poppet valve 59. The valve 59 carries a conventional O-ring. The valve 59 controls air pressure flowing from the chamber 58 to a motor passage 60 feeding pressure to the tool motor 7. A light spring 61 is located in the chamber 58 to bias the valve 59 to a closed position shutting off air pressure to the motor 7. The spring 61 is too weak to move the valve 59 and the push-rod 62 forward against the force of the spring 31.

The front end of the valve 59 engages the rear end of a push-rod 62 which extends forwardly through the motor drive shaft 17 of the motor 7 and seats on a thrust ball 63 seated in a cavity in the rear end of the arbor 15. The push-rod 62 is arranged so that as the clutch 9 initially opens or releases, the arbor 15 moves forward sufficiently to allow the valve 59 to close partly and throttle the air pressure flowing around it. The clutch mechanism is fully released at this time.

Figure 7:
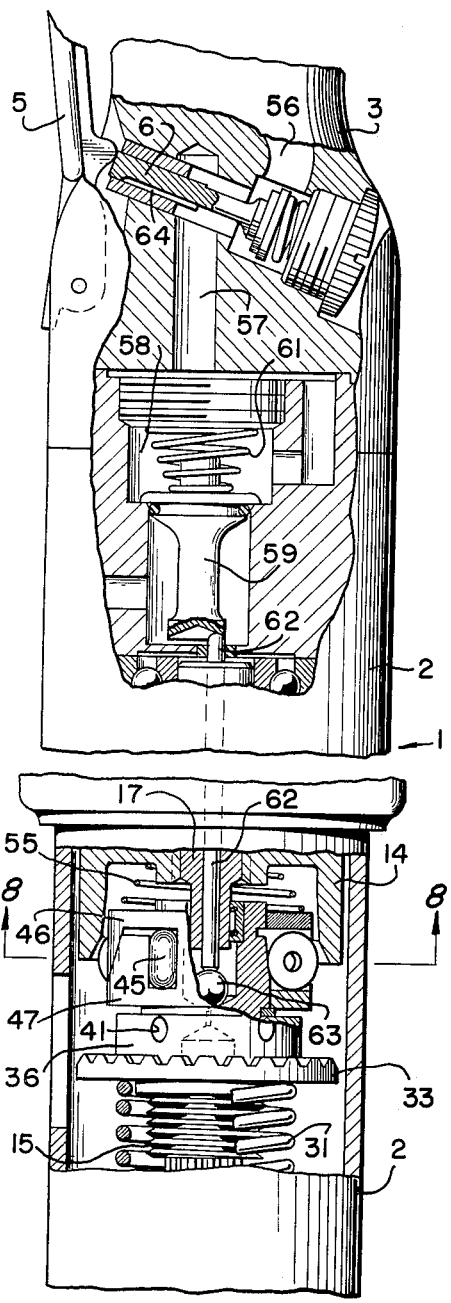
FIG. 7 is a fragmentary broken view similar to FIG. 5 showing the clutch as it is fully opened or released and is locked in open position with the motor shut-off valve fully closed.

When this throttling occurs, a higher air pressure exists in back of the valve 59 urging it forward to force the arbor 15 forward to the position shown in FIG. 7, wherein the arbor 15 is moved axially forward relative to the sleeve 14 and the sprags 45 are slightly spaced from the interior of the sleeve 14. In this position, the cages 46 and 47 can return the sprags 45 to their driving positions so that they will be properly positioned when the arbor 15 returns to its clutch-engaged position. This happens when the throttle valve 6 is closed and the air pressure in the chamber 58 is exhausted through the vent port 64 cut in the stem of the throttle valve 6.

*Operation*

Initially, prior to use, the wrench 1 and clutch mechanism 9 are in the condition shown in FIG. 1. The throttle valve 6 is closed, the motor shut-off valve 59 is open, the clutch mechanism 9 is engaged with the sprags 45 in their driving positions, as shown in FIG. 4, and the arbor 15 is urged axially rearward by the spring 31 into seating engagement against the bottom or end of the sleeve or cup 14. In these positions of the sprags 45, they will be wedged between the sleeve 14 and arbor 15 as soon as the motor 7 starts.

Prior to using the wrench 1, the operator will mount a conventional wrench socket (not shown) of desired size on the spindle 8. The selection of the size of wrench socket will correspond with the size of the fastener which is to be driven by the wrench 1.

The wrench 1 is operated by placing its socket over the fastener and depressing the throttle lever 5 to open the throttle valve 6. This feeds air pressure from the inlet passage 56 to the chamber 58 wherein it flows around the shut-off valve 59 freely and through the motor passage 60 to the motor 7. As the motor 7 starts rotating, it drives the clutch sleeve 14 in a counterclockwise direction, as shown in FIG. 4. The counterclockwise rotation of the sleeve 14 acts to tilt the sprags 45 into a wedged position between the conical interior surface of the sleeve 14 and the arbor 15. In addition, the wedging of the sprags 45 between the sleeve 14 and the arbor 15 tends to force the arbor 15 forward relative to the sleeve 14, due to the conical surfaces on the sleeve 14 and arbor 15 which creates an axially acting component of force from the wedging force on the sprags 45.

The sprags 45 will remain in driving position so long as the torque being transmitted by the sprags 45 from the sleeve 14 to the arbor 15 is insufficient to force the arbor 15 forward relative to the sleeve 14 far enough to allow the sprags 45 to tilt through radial planes to their non-driving positions shown in FIG. 6. This releasing torque of the clutch mechanism 9 will depend on the force of the spring 31 holding the arbor 15 against movement forward relative to the sleeve 14. Obviously, if the tension on the spring 31 is higher, the releasing torque load of the clutch mechanism 9 will be correspondingly higher.

As soon as the arbor 15 moves forward sufficiently, the sprags 45 are tilted to their non-driving positions shown in FIG. 6 wherein the counterclockwise rotation of the sleeve 14 acts to tilt the sprags 45 away from wedging positions between the sleeve 14 and arbor 15. At this time, the clutch mechanism 9 is released, the motor 7 spins the sleeve 14 freely without applying torque to the arbor 15, and the fastener is fully tightened to the predetermined torque load which the wrench 1 is adjusted to apply.

Figure 8:
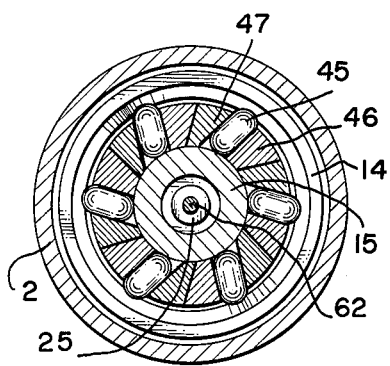
FIG. 8 is a section taken on line 8—8 of FIG. 7.

As the arbor 15 moves axially forward relative to the sleeve 14 to allow the sprags 45 to tilt into released positions, the push-rod 62 is allowed to move forward sufficient for the valve 59 to partly close, as shown in FIG. 5. In this position, the air passing around the valve 59 is throttled so that a differential pressure exists across the valve 59 sufficient to urge the valve 59 forward to a completely closed position, as shown in FIG. 7. The closing of the valve 59 forces the push-rod 62 further forward to move the arbor 15 further apart from the sleeve 14. The forward movement of the arbor 15 relative to the sleeve 14 widens the annular space 27 and disengages the sprags 45 entirely from the sleeve 14. Freeing the sprags 45 from the sleeve 14 allows them to tilt back to their driving positions, as shown in FIG. 8. This return of the sprags 45 to driving position is accomplished by the sprag cages 46 and 47 being urged axially together by the light spring 55. Since the sprags 45 are returned to driving positions, they are properly orientated for the time that the arbor 15 is allowed to return to its clutch-engaged position relative to the sleeve 14.

The valve 59 is allowed to re-open whenever the throttle valve 6 is closed. This happens when the fastener driving operation is completed and the operator releases the throttle lever 5. Closing the throttle valve 6 opens the vent port 64 which exhausts the passage 57 and chamber 58 to remove the pressure from the rear of the valve 59. Once the air pressure is removed from the valve 59, the heavy spring 31 forces the arbor 15 rearwardly to re-engage the clutch mechanism 9. The spring 31 also forces the push-rod 62 rearward to open the shut-off valve 59, as shown in FIG. 1. At this time, the wrench 1 is ready for further use.

Although this application describes a single embodiment, it should be recognized that the invention is not limited merely to this embodiment, but contemplates other embodiments and variations which utilize the concepts and teachings of the invention.

Having described my invention, I claim:

1. A torque responsive clutch adapted to release at a predetermined torque load, comprising:
   (a) a driving clutch member;
   (b) a driven clutch member axially aligned with said driving clutch member;
   (c) said clutch members being axially movable relative to each other;
   (d) one of said clutch members including an inner portion and the other clutch member including an outer portion housing said inner portion on the one member and spaced from said inner portion to form an annular space therebetween;
   (e) a plurality of tiltable sprags mounted between said inner and outer portions and adapted to be wedged between said portions in tilted driving positions to transmit torque in one direction of rotation from said driving clutch member to said driven clutch member;
   (f) one of said portions having a conical surface engaging said sprags so that moving said portions axially apart widens the annular space between said portions and allows said sprags to tilt to non-driving positions wherein they cannot transmit torque from said driving clutch member to said driven clutch member in said one direction of rotation; and
   (g) biasing means urging said clutch members relatively axially together with a predetermined force whereby said sprags can transmit a predetermined maximum torque prior to tilting to their non-driving positions.

2. The torque responsive clutch of claim 1 including:
   (a) sprag-return means resiliently urging said sprags to their driving positions and operative to allow said sprags to tilt to their non-driving positions.

3. The torque responsive clutch of claim 2 wherein said sprag return means includes:
   (a) a pair of cages sandwiching said sprags and movable relatively axially apart to allow said sprags to tilt to their non-driving positions; and
   (b) means lightly biasing said pair of cages axially together to urge said sprags to their driving positions.

4. The torque responsive clutch of claim 2 wherein:
   (a) said sprag-return means is operative to return said sprags to their driving positions when said clutch members are moved relatively axially apart; and
   (b) said sprag return means includes means for moving said clutch member relatively axially apart in response to the release of said clutch members.

5. The torque responsive clutch of claim 2 wherein:
   (a) said sprags are annular in shape.

6. A rotary power wrench containing a torque responsive clutch adapted to release at a predetermined torque load, comprising:
   (a) a tool motor;
   (b) throttle means operable by an operator to energize said motor;
   (c) a clutch driven by said motor and including a pair of clutch members adapted to be engaged for transmitting the torque of said motor and disengaged for releasing the motor;
   (d) said clutch members being mounted for axial relative movement;
   (e) one of said clutch members including a hollow sleeve portion having an inner circular surface;

(f) the other clutch member including an arbor portion slidably mounted axially in said hollow sleeve portion and having an exterior circular surface spaced from said inner circular surface to form an annular space therebetween;
(g) one of said surfaces being tapered so that moving said clutch members axially apart widens said annular space;
(h) a plurality of tiltable sprags located in said annular space between said inner and outer circular surfaces and adapted to be tilted to driving positions between said surfaces wherein said sprags can wedge between said surfaces and transmit torque from said tool motor in a given rotation direction, said sprags in their driving positions acting to urge said clutch members axially apart to widen said annular space and being operative to tilt to non-wedged non-driving positions when said clutch members move relatively axially apart a slight distance; and
(i) biasing means urging said clutch members axially together with a predetermined force to prevent said sprags from tilting to their non-driving positions below a predetermined maximum torque load on the clutch.

7. The rotary power wrench of claim 6 including:
(a) sprag-return means resiliently urging said sprags to their driving positions and operative to allow said sprags to tilt to their non-driving positions under a relatively small force.

8. The rotary power wrench of claim 7 wherein said sprag return means includes:

(a) a pair of cages sandwiching said sprags and movable relatively axially apart to allow said sprags to tilt to their non-driving positions; and
(b) means lightly biasing said pair of cages axially together to urge said sprags to their driving positions.

9. The rotary power wrench of claim 8 including:
(a) means operative to move said clutch members axially apart in response to the release of said clutch members wherein said sprags can be tilted back to their driving positions by said sprag-return means.

10. The rotary power wrench of claim 7 including:
(a) a fluid piston connected to one of said clutch members and operative to move said clutch members relatively axially apart when subjected to a differential pressure on its two ends; and
(b) means operative to create a differential pressure on the ends of said piston in response to the release of said clutch members.

11. The rotary power wrench of claim 10 wherein:
(a) said piston is operative to shut-off power to said tool member as it moves said clutch members relatively axially apart.

References Cited by the Examiner

UNITED STATES PATENTS 3,187,860   6/1965   Simmons _____ 192—150 X

DAVID J. WILLIAMOWSKY, *Primary Examiner.*